United States Patent
Hong et al.

(10) Patent No.: US 11,577,449 B2
(45) Date of Patent: Feb. 14, 2023

(54) METHOD FOR MANUFACTURING POLYIMIDE-BASED FILM AND POLYIMIDE-BASED FILM MANUFACTURED THEREBY

(71) Applicant: Kolon Industries, Inc., Seoul (KR)

(72) Inventors: Ki Il Hong, Seoul (KR); Hak-Gee Jung, Seoul (KR)

(73) Assignee: Kolon Industries, Inc., Seoul (KR)

( * ) Notice: Subject to any disclaimer, the term of this patent is extended or adjusted under 35 U.S.C. 154(b) by 156 days.

(21) Appl. No.: 16/762,376

(22) PCT Filed: Dec. 4, 2018

(86) PCT No.: PCT/KR2018/015280
§ 371 (c)(1),
(2) Date: May 7, 2020

(87) PCT Pub. No.: WO2019/112311
PCT Pub. Date: Jun. 13, 2019

(65) Prior Publication Data
US 2020/0353668 A1    Nov. 12, 2020

(30) Foreign Application Priority Data

Dec. 4, 2017   (KR) .................. 10-2017-0165156
Dec. 4, 2018   (KR) .................. 10-2018-0154803

(51) Int. Cl.
| | |
|---|---|
| B29C 55/12 | (2006.01) |
| B29C 71/02 | (2006.01) |
| B29C 55/14 | (2006.01) |
| C08J 5/18 | (2006.01) |
| B29K 79/00 | (2006.01) |

(52) U.S. Cl.
CPC ............ B29C 55/143 (2013.01); B29C 71/02 (2013.01); C08J 5/18 (2013.01); *B29K 2079/08* (2013.01); *B29K 2995/0051* (2013.01); *B29K 2995/0053* (2013.01); *C08J 2379/08* (2013.01)

(58) Field of Classification Search
None
See application file for complete search history.

(56) References Cited

U.S. PATENT DOCUMENTS

| | | | | |
|---|---|---|---|---|
| 5,260,407 | A | 11/1993 | Saruwatari | |
| 2013/0011651 | A1 | 1/2013 | Iizumi | |
| 2013/0157035 | A1* | 6/2013 | Uehara | B29D 7/01 521/143 |
| 2017/0183462 | A1 | 6/2017 | Song | |
| 2017/0342224 | A1 | 11/2017 | Chae | |

FOREIGN PATENT DOCUMENTS

| | | | | |
|---|---|---|---|---|
| CN | 104250529 | A | 12/2014 | |
| CN | 106893121 | A | 6/2017 | |
| EP | 2800104 | A1 | 11/2014 | |
| JP | H-05169526 | * | 12/1991 | ............ B29C 55/02 |
| JP | 5-169526 | A | 7/1993 | |
| JP | H05169528 | A | 7/1993 | |
| JP | H05331287 | A | 12/1993 | |
| JP | 2009007500 | A | 1/2009 | |
| JP | 4318111 | B2 * | 8/2009 | |
| JP | 2011-116021 | A | 6/2011 | |
| JP | 2013-082149 | A | 5/2013 | |
| JP | 2013-193413 | A | 9/2013 | |
| JP | 2015010107 | A | 1/2015 | |
| JP | 2015508345 | A | 3/2015 | |
| JP | 2017186473 | A | 10/2017 | |
| KR | 10-2015-0001662 | A | 1/2015 | |
| KR | 2015/0001662 | * | 1/2015 | ............ B32B 15/08 |
| KR | 101729731 | B1 | 4/2017 | |
| WO | 2005111164 | A1 | 11/2005 | |
| WO | 2017150377 | A1 | 9/2017 | |
| WO | 2017169646 | A1 | 10/2017 | |

OTHER PUBLICATIONS

KR-2015/0,001,662 (Satoshi) Jan. 2015 (online machine translation), [Retrieved on May 2, 2022], Retrieved from: Espacenet (Year: 2015).*
JPH-05,169,526 (Hitoshi) Dec. 1991 (online machine translation), [Retrieved on May 2, 2022], Retrieved from: Espacenet (Year: 1991 ).*
Poisson's ratio. (Nov. 30, 2017). Wikipedia. https://web.archive.org/web/20171130005111/https://en.wikipedia.org/wiki/Poisson's_ratio (Year: 2017).*
JP-4,318,111 (a.) Koichi) Aug. 2009 (online machine translation), [Retrieved on Oct. 12, 2022], Retrieved from: Espacenet (Year: 2009).*
International Search Report for PCT/KR2018/015280 dated Mar. 26, 2019 (PCT/ISA/210).
JP OA dated Apr. 23, 2021.
Counterpart Chinese office action dated Jul. 19, 2021.
Counterpart EP search report dated Jul. 19, 2021.
JP office action dated Oct. 26, 2022.

* cited by examiner

*Primary Examiner* — Alison L Hindenlang
*Assistant Examiner* — Andrés E. Behrens, Jr.
(74) *Attorney, Agent, or Firm* — Harvest IP Law, LLP

(57) ABSTRACT

The present invention relates to a method for manufacturing a polyimide-based film and a polyimide-based film manufactured thereby and, particularly, to a method for manufacturing a polyimide-based film and a polyimide-based film manufactured thereby, wherein the polyimide-based film is useful as a cover substrate for a flexible electronic device since flexure characteristics thereof, represented by yield elongation, are excellent.

7 Claims, No Drawings

METHOD FOR MANUFACTURING POLYIMIDE-BASED FILM AND POLYIMIDE-BASED FILM MANUFACTURED THEREBY

CROSS REFERENCE TO RELATED APPLICATIONS

This application is a National Stage of International Application No. PCT/KR2018/015280 filed Dec. 4, 2018, claiming priority based on Korean Patent Application No. 10-2017-0165156, filed Dec. 4, 2017 and Korean Patent Application No. 10-2018-0154803, filed Dec. 4, 2018.

TECHNICAL FIELD

The present disclosure relates to a method for manufacturing a polyimide-based film and a polyimide-based film manufactured thereby.

BACKGROUND ART

Recently, bendable or foldable electronic devices including flexible electronic devices such as flexible photoelectric devices including flexible OLEDs, lightweight displays, flexible encapsulants, color EPDs, plastic LCDs, TSPs and OPVs have attracted attention as next-generation displays. In particular, devices such as foldable or rollable devices are developed so that flexible displays can be realized and at the same time, a new type of flexible substrate that can protect a lower element is required.

Various high-hardness plastic substrates are considered as candidates of materials for flexible display substrates. Thereamong, a transparent polyimide film capable of realizing high hardness at a small thickness is considered as a major candidate for a cover substrate. However, the substrate for the display cover basically needs to maintain high hardness, low moisture permeability, chemical resistance and light transmittance to protect components included in the display device. However, conventional transparent plastic substrates have a limitation in securing abrasion resistance as well as low surface hardness compared to glass. For this purpose, a number of technologies have been developed to improve the surface hardness of polymer films. However, the technologies have difficulty in realizing bending characteristics of a curvature radius of 1 mm or less, while securing surface hardness.

Meanwhile, in order to improve the surface hardness of a plastic substrate, Korean Patent Laid-open No. 2010-0041992 provides a high-hardness hard coating film composition containing an ultraviolet curable polyurethane acrylate oligomer, and International Publication No. WO 2013-187699 suggests a high-hardness siloxane resin composition containing an alicyclic epoxy group, a method for preparing the same, and an optical film including the cured product.

As described above, techniques for improving the hardness of substrate materials for display covers have been actively proposed, but these techniques have limitations in improving the bending characteristics of films. Moreover, manufacturing technologies that can significantly improve the bending characteristics of films while securing low water permeability and abrasion resistance required for plastic substrates to be utilized in a wider range of applications, in addition to the cover substrate, remain incomplete.

DISCLOSURE

Technical Problem

Therefore, it is one object of the present disclosure to provide a method for manufacturing a polyimide-based film having dramatically improved bending characteristics while maintaining basic physical properties of polyimide-based films, and a polyimide-based film manufactured thereby. Furthermore, it is another object of the present disclosure to provide a polyimide-based film having improved bending characteristics while securing surface hardness and optical properties.

Technical Solution

In accordance with one aspect of the present disclosure to solve the technical problems, provided is a method of manufacturing a polyimide-based film in a roll-to-roll manner including conducting first heat treatment (S1) on a polyimide-based film obtained as a gel state formed by being cast on a support while elongating the polyimide-based film at an elongation percentage of not less than 100% and less than 135% in a machine direction (MD) and shrinking the polyimide-based film at a shrinkage percentage of more than 75% and not more than 100% in a transverse direction (TD) (except in the case where the elongation percentage in the machine direction is equal to the shrinkage percentage in the transverse direction) and conducting second heat treatment (S2) on the first heat-treated polyimide-based film while further elongating the polyimide-based film in the machine direction (MD) at a tension not less than 30 N/mm$^2$ and less than 160 N/mm$^2$, wherein a maximum heating temperature during the first heat treatment is 250° C. to 330° C., and the second heat treatment is performed for 200 seconds or longer at a temperature within −10° C. to +30° C. of the maximum heating temperature reached during the first heat treatment.

In step (S1), the elongation percentage in the machine direction may be more preferably 105% to 130%, or 115% to 130%.

In step (S1), the shrinkage percentage in the transverse direction may be more preferably 80% to 100%, or 80% to 95%.

In step (S2), the time for the second heat treatment may be more preferably not less than 200 seconds and less than 1,500 seconds.

In step (S2), the tension may be more preferably 30 N/mm$^2$ to 150 N/mm$^2$.

In accordance with another aspect of the present disclosure, provided is a polyimide-based film manufactured according to the above-described method.

In this case, the polyimide-based film has a yield strain of 3% or more in a uniaxial direction, and furthermore, has a pencil hardness of 1H or more based on ASTM D3363 measurement, and a yellowness of 5.0 or less and a light transmittance of 85% or more at 550 nm based on measurement with a CM-3700D produced by Konica Minolta, Inc.

Advantageous Effects

The present disclosure provides a polyimide-based film that has excellent bending characteristics and thus can be useful as a substrate for various applications of flexible electronic devices having rollability or foldability.

In addition, the polyimide-based film of the present disclosure has bending characteristics and secures optical properties such as excellent surface hardness and scratch resistance. In particular, the polyimide-based film is highly useful as a cover substrate for flexible electronic devices.

BEST MODE

In one aspect, the present disclosure is directed to a method of manufacturing a polyimide-based film in a roll-to-roll manner including conducting first heat treatment (S1) on a polyimide-based film obtained as a gel state formed by being cast on a support while elongating the polyimide-based film at an elongation percentage of not less than 100% and less than 135% in a machine direction (MD) and shrinking the polyimide-based film at a shrinkage percentage of more than 75% and not more than 100% in a transverse direction (TD) (except in the case where the elongation percentage in the machine direction is equal to the shrinkage percentage in the transverse direction) and conducting second heat treatment (S2) on the first heat-treated polyimide-based film while further elongating the polyimide-based film in the machine direction (MD) at a tension not less than 30 N/mm$^2$ and less than 160 N/mm$^2$, wherein a maximum heating temperature during the first heat treatment is 250° C. to 330° C., and the second heat treatment is performed for 200 seconds or longer at a temperature within −10° C. to +30° C. of the maximum heating temperature reached during the first heat treatment.

One object of the present disclosure is to provide a polyimide-based film having physical properties suitable for application to a cover substrate for foldable or rollable devices having a radius of curvature of 1 mm (1R) or less. The polyimide-based film should withstand very strong physical stress in order for the film to be applied to such a device. In other words, the polyimide-based film should have bending characteristics enabling the film to return to an original state thereof even when deformation is applied thereto hundreds of thousands of times or more.

In general, a polymer has viscoelastic behavior which may exhibit elastic or viscous behavior depending on thermal and physical conditions. The behavior enabling the film to return to its original state is referred to as "elastic behavior", and the major object of the present disclosure is to provide a polyimide-based film that exhibits elastic behavior when deformed at a radius of curvature of 1 mm or less.

Hereinafter, the present disclosure will be described in more detail.

First, in general, when the polyimide-based film obtained as a gel state is naturally dried, the solvent is evaporated and the film is inevitably shrunk in the imidization process. Accordingly, in order to control such shrinkage of the film, the film is often fixed to a certain frame such as a tenter. The method according to the present disclosure includes, under these control conditions of the film, conducting first heat treatment (S1) on a polyimide-based film obtained as a gel state while elongating the polyimide-based film at an elongation percentage of not less than 100% and less than 135% in a machine direction (MD) and shrinking the polyimide-based film at a shrinkage percentage of more than 75% and not more than 100% in a transverse direction (TD) (except in the case where the elongation percentage in the machine direction is equal to the shrinkage percentage in the transverse direction).

At this time, in step (S1), the elongation in the machine direction is 105% or more, or 105% to 130%, or 115% to 130%, and the shrinkage in the transverse direction is 100% or less, or 80% to 100%, or 80% to 95%, since it is advantageous in securing better bending characteristics.

However, when the elongation in the machine direction is less than 100%, there is a problem that a desired yield strain cannot be obtained due to insufficient orientation of the polymer, and when the elongation in the machine direction is 130% or more, there is a problem in that the film is broken due to low strain at break resulting from the nature of polyimide. As used herein, the term "100% elongation" means an elongation requirement to prevent shrinkage. As described above, when the polyimide-based film is not fixed, the film inevitably shrinks during removal of the solvent. Therefore, it is obvious to those skilled in the art that 100% elongation does not avoid any change in the film.

In addition, when the shrinkage is 75% or less, there is a problem in that the film sags and contacts the floor due to excessive shrinkage, and may eventually break. When the shrinkage exceeds 99%, the desired yield strain cannot be obtained due to relatively insufficient uniaxial orientation in the machine direction.

As such, the present disclosure controls the shrinkage of the film in the production of the polyimide-based film to provide the maximum orientation as long as the film does not break and thereby to obtain the desired physical properties, in particular, yield strain. The uniaxial elongation is used in the present disclosure to elongate the polyimide film as much as possible since the polyimide film cannot elongate to a high level due to the nature of the polyimide. It may be difficult to obtain the desired orientation through biaxial elongation.

In addition, since foldable or rollable devices generally require bending characteristics in one direction, the film is sufficiently applicable to the devices when it has a yield strain of 3% or more in either the machine direction (MD) or the transverse direction (TD). However, in the present disclosure, the elongation and yield strain are based on the machine direction, since uniaxial elongation in the machine direction can often be more advantageous in terms of process efficiency. When there is no problem associated with the process, the elongation and shrinkage directions may be interchangeable. In this case, the elongation in the transverse direction and the shrinkage in the machine direction may be performed under the conditions described above, and the yield strain may be measured in the elongation direction.

In the present disclosure, the first heat treatment may be performed after heating the temperature to 250° C. to 330° C., or after reaching the maximum heating temperature. In terms of the process conditions, preferably, the temperature is elevated from 60° C. to 120° C. until it reaches 250° C. to 330° C. In this case, the first heat treatment may be performed for a period of time of 1 minute to 8 hours, but is not necessarily limited thereto.

Typically, when forming a polyimide-based film, a polyamic acid (polyimide or polyimide-amide precursor) solution or a polyimide-based resin is cast on a support and then heated at 80 to 200° C., preferably 100 to 180° C., to activate a dehydrating agent and/or an imidization catalyst and a partially cured and dried gel-state film is peeled off from the support. In order to prevent deformation of the film, the initial temperature prior to heating in the first heat treatment of the present disclosure is preferably 60° C. to 120° C. which is similar to the temperature of the imidization.

However, when the minimum heating temperature is lower than 250° C., the corresponding imidization may not be sufficiently achieved, and when the minimum heating temperature exceeds 330° C., excessively high yellowness (YI) of the polyimide may restrict use thereof as a display material. Thus, it is preferable to adjust the minimum heating temperature within the range defined above.

Meanwhile, in order to solve the thermal history and residual stress remaining in the film and to obtain a maximum orientation effect while preventing the film from being broken due to excessive stress, the method according to the present disclosure includes conducting second heat treatment (S2) while further elongating the first heat-treated polyimide-based film in the machine direction (MD) at a tension not less than 30 N/mm$^2$ and less than 160 N/mm$^2$. In this case, the second heat treatment is performed for 200 seconds or longer at a temperature within −10° C. to +30° C. of the maximum heating temperature reached during the first heat treatment. In order to prevent an increase in yellowness while obtaining excellent yield strain, the second heat treatment is more preferably performed for a period of time of 200 seconds to 1,500 seconds, or 200 seconds to 1,000 seconds.

In the present disclosure, the tension applied during the second heat treatment may be interpreted as a force that the film receives per unit area in the machine direction.

In the case where the temperature during the second heat treatment is lower than −10° C. of the maximum heating temperature during the first heat treatment, when anhydride is added as a monomer, the anhydride substituted at the end group is not crosslinked and thus heat setting is not sufficiently achieved, and even when anhydride is not used, it is difficult to obtain a high yield strain due to insufficient orientation. Meanwhile, in the case where the temperature during the second heat treatment exceeds +30° C. of the maximum heating temperature during the first heat treatment, the polyimide is limited in use as a display material due to excessively high yellowness (YI) of the polyimide. That is, when the time in the second heat treatment falls within the range defined above, there are effects of obtaining sufficient orientation and preventing an increase in yellowness due to excessive heat treatment.

Meanwhile, in the present disclosure, the polyimide-based film is formed by copolymerization with any combination of (i) diamine and dianhydride, (ii) diamine, dianhydride and an aromatic dicarbonyl compound, (iii) diamine, dianhydride and anhydride, or (iv) diamine, dianhydride, anhydride and an aromatic dicarbonyl compound, followed by imidization, wherein an equivalent ratio of the total of the remaining monomers to diamine is 1:1. Among the combinations, it is preferable to add anhydride when capping the end of the polyimide molecular chain, but the present disclosure is not necessarily limited thereto.

The dianhydride that can be used in the present disclosure includes, but is not limited to, one or a combination of two or more selected from 2,2-bis(3,4-dicarboxyphenyl) hexafluoropropane dianhydride (6FDA), 4-(2,5-dioxotetrahydrofuran-3-yl)-1,2,3,4-tetrahydronaphthalene-1,2-dicarboxylic dianhydride (TDA), pyromellitic dianhydride (1,2,4,5-benzene tetracarboxylic dianhydride (PMDA)), benzophenone tetracarboxylic dianhydride (BTDA), biphenyl tetracarboxylic dianhydride (BPDA), biscarboxyphenyl dimethyl silane dianhydride (SiDA), oxydiphthalic dianhydride (ODPA), bisdicarboxyphenoxy diphenyl sulfide dianhydride (BDSDA), sulfonyl diphthalic anhydride (SO$_2$DPA), cyclobutane tetracarboxylic dianhydride (CBDA), isopropylidenediphenoxy bisphthalic anhydride (6HDBA) and the like.

In addition, the diamine that can be used in the present disclosure includes, but is not limited to, one or a combination of two or more selected from oxydianiline (ODA), p-phenylenediamine (pPDA), m-phenylenediamine (mPDA), p-methylenedianiline (pMDA), m-methylenedianiline (mMDA), bistrifluoromethyl benzidine (TFDB), cyclohexanediamine (13CHD, 14CHD), bisaminohydroxy phenyl hexafluoropropane (DBOH), bisaminophenoxy benzene (133APB, 134APB, 144APB), bisamino phenyl hexafluoropropane (33-6F, 44-6F), bisaminophenylsulfone (ODDS, 3DDS), bisaminophenoxy phenyl hexafluoropropane (4BDAF), bisaminophenoxy phenylpropane (6HMDA), bisaminophenoxy diphenyl sulfone (DBSDA), and the like.

In addition, the anhydride that can be used in the present disclosure includes, but is not limited to, one or a combination of two or more selected from bicycloheptene dicarboxylic anhydride (Nadic anhydride), 4-(9-anthracenyl ethynyl)phthalic anhydride, 1-adamatanecarbonyl chloride, 1,3-adamantanedicarbonyl dichloride, 5-norbornene-2-carbonyl chloride, 5-norbornene-2,3-dicarbonyl chloride, cyclopentanecarbonyl chloride, and the like.

In addition, when the polyimide of the present disclosure is a polyamide-imide having an amide structure, an aromatic dicarbonyl compound may be added as a monomer. In this case, the aromatic dicarbonyl compound that can be used includes, but is not limited to, one or a combination of two or more selected from p-terephthaloyl chloride, terephthalic acid, isophthaloyl dichloride, 4,4'-biphenyldicarbonyl chloride and the like.

The process for producing a polyimide-based film in a roll-to-roll manner using the monomers described above is not particularly limited and an example of the manufacturing method according to the present disclosure will be described below.

The monomer selected from the above-mentioned monomers is dissolved in a first solvent and the resulting solution is polymerized to prepare a polyamic acid solution (a precursor of polyimide or polyimide-amide). At this time, although the reaction conditions are not particularly limited, the reaction temperature is preferably −20 to 80° C. and the reaction time is preferably 2 to 48 hours. In addition, more preferably, the reaction is performed under an inert atmosphere such as argon or nitrogen.

When anhydride is added as the monomer, the amount of anhydride added during the reaction may affect the molecular weight. In order to prevent deterioration in the inherent physical properties of the polyimide, anhydride that is added may be 10 mol % or less, preferably 5 mol % or less with respect to the total mole of dianhydride and anhydride. When the anhydride is used in a large amount exceeding 10 mol %, the molecular weight is lowered, and optical properties are deteriorated, for example, the yellowness increases and transmittance decreases. Instead, the increased anhydride content results in crosslinking, which may cause improvement in thermal properties. However, crosslinking in a large amount may also disrupt the arrangement of the polymer chains, which may result in reduced surface hardness.

In addition, in order to obtain a polyimide-based film having a polyamide-imide structure, the molecular weight may vary depending on the amount of the added aromatic dicarbonyl compound among the monomers. In order to prevent deterioration in the inherent physical properties of the polyimide, the aromatic dicarbonyl compound that is added may be 10 mol % or more and 80 mol % or less, preferably 30 mol % or more and 70 mol % or less with respect to the total mole of the dianhydride and aromatic dicarbonyl compound. When the aromatic dicarbonyl compound is used in a large amount exceeding 80 mol %, optical properties are deteriorated, for example yellowness increases and transmittance decreases, and a gel is formed in the polyamic acid solution, which makes it difficult to obtain a film during film formation. In addition, when the aromatic dicarbonyl compound is used at 10 mol % or less, optical properties are improved, but thermal properties are deteriorated, for example, the coefficient of thermal expansion decreases.

The solvent for polymerization of the monomers is not particularly limited as long as it is capable of dissolving polyamic acid. As a known reaction solvent, at least one polar solvent selected from m-cresol, N-methyl-2-pyrrolidone (NMP), dimethylformamide (DMF), dimethylacetamide (DMAc), dimethylsulfoxide (DMSO), acetone and ethyl acetate is used. In addition, a low boiling point solution such as tetrahydrofuran (THF) or chloroform or a low absorbent solvent such as γ-butyrolactone may be used.

The content of the solvent is not particularly limited, but the content of the first solvent is preferably 50 to 95% by weight, and more preferably 70% to 90% by weight, with respect to the total weight of the polyamic acid solution, in order to obtain the appropriate molecular weight and viscosity of the polyamic acid solution.

As described above, the polyimide-based film can be prepared by polymerizing the polyamic acid solution and imidizing and heat-treating the resulting product at a high temperature to form a film. At this time, the prepared polyimide-based resin preferably has a glass transition temperature of 200 to 400° C. in consideration of thermal stability.

The method for producing the polyimide-based film from the polyamic acid solution includes thermal imidization, chemical imidization, or a combination of thermal imidization and chemical imidization.

Chemical imidization is a method of introducing an imidization catalyst represented by a tertiary amine such as isoquinoline, β-picoline or pyridine, and a dehydrating agent represented by acid anhydride such as acetic anhydride to the polyamic acid solution. When thermal imidization or a combination of thermal imidization and chemical imidation is used, the heating conditions of the polyamic acid solution may vary depending on the type of the polyamic acid solution, the thickness of the produced polyimide-based film and the like.

The case where the polyimide-based film is produced using a combination of thermal imidization and chemical imidization will be described in more detail below. A dehydrating agent and an imidization catalyst are added to a polyamic acid solution, the resulting solution is cast on a support and heated at 80 to 200° C., preferably 100 to 180° C. to activate the dehydrating agent and the imidation catalyst, and a partially cured and dried gel-phase polyamic acid film is peeled off from the support, fixed to a support and subjected to heat treatment to obtain a polyimide-based film. The gel-type film can be fixed using a pin-type frame or a clip. The support used herein may be a glass plate, an aluminum foil, a circulating stainless belt, a stainless drum or the like.

Meanwhile, in the present disclosure, a polyimide-based film may be produced from the obtained polyamic acid solution as follows. That is, the obtained polyamic acid solution is imidized, the imidized solution is added to a second solvent, precipitated, filtered and dried to obtain a polyimide resin as a solid, the solid-type obtained polyimide resin is dissolved again in a first solvent, cast on a support and heated for 1 to 8 hours while slowly raising the temperature within the range of 40 to 400° C. as described above to obtain a polyimide-based film as a gel.

The first solvent may be the same solvent as the solvent used for polymerization of the polyamic acid solution, and the second solvent may have a lower polarity than the first solvent in order to obtain a solid of the polyimide resin and specific examples thereof may include at least one selected from water, alcohol, ether and ketone.

In this case, the content of the second solvent is not particularly limited, but is preferably 5 to 20 times the weight of the polyamic acid solution.

Regarding the conditions for filtering and drying the obtained polyimide resin solid, preferably, the temperature is 50 to 120° C. and the time is 3 to 24 hours in consideration of the boiling point of the second solvent.

In addition, when producing a polyimide-based film, a filler may be added in the preparation of a polyamic acid solution to improve various properties such as flexibility, thermal conductivity, conductivity and corona resistance. The filler is not particularly limited and preferred examples thereof include silica, titanium oxide, layered silica, carbon nanotubes, alumina, silicon nitride, boron nitride, calcium hydrogen phosphate, calcium phosphate, and mica.

The particle diameter of the filler may be varied depending on the characteristics of the film to be modified and the type of filler added, but is not particularly limited. Generally, the average particle diameter is preferably 0.001 to 50 μm, more preferably 0.005 to 25 μm, even more preferably, 0.01 to 10 μm. In this case, the polyimide-based film efficiently exhibits the modification effects and excellent surface properties, conductivity and mechanical properties.

In addition, the amount of the filler may be varied depending on the characteristics of the film to be modified and the type of the filler added, and is not particularly limited. In general, the content of the filler is preferably 0.001 to 20 parts by weight, more preferably 0.01 to 10 parts by weight, with respect to 100 parts by weight of the polyamic acid solution, in order to provide the properties to be modified without impairing the bonding structure of the polymer resin.

In the present disclosure, by performing steps (S1) and (S2) on the polyimide-based film obtained as the gel state formed by being cast on a support as described above, a polyimide-based film for foldable and rollable displays having excellent bending characteristics can be manufactured.

The thickness of the polyimide-based film obtained by such a method is not particularly limited and is preferably within the range of 10 to 250 μm, more preferably 25 to 150 μm.

In another aspect, the present disclosure is directed to a polyimide-based film manufactured by the method described above.

The manufactured polyimide-based film can have physical properties such as a yield strain of 3% or more in the uniaxial direction, and furthermore, a pencil hardness of 1H or more, preferably 1H to 3H, based on ASTM D3363 measurement, and a yellowness of 5.0 or less, preferably 4.0 or less, and a light transmittance of 85% or more, preferably 88% or more, at 550 nm based on measurement with a CM-3700D produced by Konica Minolta, Inc.

When the yield strain is less than 3%, deformation in the radius of curvature of 1 mm or less may be permanent, thus making it impossible for the film to return to the original shape thereof and causing a limitation in practical use as a cover substrate for foldable or rollable display devices. Since the polyimide-based film of the present disclosure can secure a yield strain of 3% or more through uniaxial elongation, it can return to the original shape thereof even when deformed hundreds of thousands of times or more at a radius of curvature of 1 mm or more, and is thus applied to a cover substrate for foldable or rollable display devices.

In addition, in the present disclosure, the polyimide-based film can ensure scratch resistance to protect the lower element owing to surface hardness of 1H or more, and can satisfy optical properties such as yellowness less than 5 and a light transmittance of 85% or more, thus being sufficiently applied as a cover substrate for displays.

MODE FOR DISCLOSURE

EXAMPLE

Hereinafter, the present disclosure will be described in more detail with reference to Examples. The examples are provided only for better understanding of the present disclosure, and should not be construed as limiting the scope of the present disclosure.

Preparation Example 1. Preparation of Polyimide-Based Resin 832 g of N,N-dimethylacetamide (DMAc) was charged in a 1 L reactor equipped with a stirrer, a nitrogen injector, a dropping funnel, a temperature controller and a cooler, as a reactor, while passing nitrogen through the reactor, the temperature of the reactor was adjusted to 25° C., 6.4646 g (0.2 mol) of bistrifluoromethyl benzidine (TFDB) was dissolved therein, and the solution was maintained at 25° C. 31.09 g (0.07 mol) of 2,2-bis(3,4-dicarboxyphenyl) hexafluoropropane dianhydride (6FDA) and 8.83 g (0.03 mol) of biphenyl tetracarboxylic dianhydride (BPDA) were added to the solution and dissolved and allowed to react while stirring for a predetermined period of time. At this time, the temperature of the solution was maintained at 25° C. Then, 20.302 g (0.1 mol) of terephthaloyl chloride (TPC) was added to the solution to obtain a polyamic acid solution having a solid content of 13% by weight.

25.6 g of pyridine and 33.1 g of acetic anhydride were added to the polyamic acid solution, the resulting mixture was stirred for 30 minutes and then further stirred at 70° C. for 1 hour, cooled to room temperature and precipitated with 20 L of methanol, the precipitated solid was filtered, pulverized and dried under vacuum at 100° C. for hours to obtain 111 g of polyimide-amide as a solid powder.

Example 1

0.03 g (0.03 wt %) of amorphous silica particles having an OH group bonded to the surface thereof was added to N,N-dimethylacetamide (DMAc) at a dispersion concentration of 0.1% and sonicated until the solvent became transparent. Then, 100 g of the polyamide-imide obtained as the solid powder in Preparation Example 1 was dissolved in 670 g of the N,N-dimethylacetamide (DMAc) in which the silica particles were dispersed, to obtain a 13 wt % solution. The solution thus obtained was applied to a stainless steel plate, cast to 200 μm and dried with hot air of 130° C. for 30 minutes, and then the film was peeled off from the stainless steel plate and fixed to the frame with a pin. At this time, the film fixed to the frame was elongated at 115% in the machine direction and shrunk at 85% in the transverse direction.

Then, the frame, on which the film was fixed, was placed in a vacuum oven, slowly heated from 100° C. to 300° C. for 2 hours (first heat treatment) and then slowly cooled, and then a polyimide-based film was obtained by separation from the frame. Subsequently, the film was subjected to heat treatment again at 310° C. for 300 seconds, as a final heat treatment (second heat treatment). At this time, a tension of 80 N/mm$^2$ was applied in the machine direction during the final heat treatment to perform further elongation and heat setting in the machine direction.

At this time, the thickness of the produced polyimide-based film was 50 μm.

Example 2

A polyimide-based film was produced in the same manner as in Example 1, except that the fixed frame was elongated at 105% in the machine direction and shrunk at 85% in the transverse direction.

Example 3

A polyimide-based film was produced in the same manner as in Example 1, except that the fixed frame was elongated at 130% in the machine direction and shrunk at 85% in the transverse direction.

Example 4

A polyimide-based film was produced in the same manner as in Example 1, except that the fixed frame was elongated at 115% in the machine direction and shrunk at 95% in the transverse direction.

Example 5

A polyimide-based film was produced in the same manner as in Example 1, except that the fixed frame was elongated at 115% in the machine direction and shrunk at 80% in the transverse direction.

Example 6

A polyimide-based film was produced in the same manner as in Example 1, except that the final heat treatment was performed at 300° C.

Example 7

A polyimide-based film was produced in the same manner as in Example 1, except that the final heat treatment was performed at 320° C.

Example 8

A polyimide-based film was produced in the same manner as in Example 1, except that the final heat treatment was performed at 290° C.

Example 9

A polyimide-based film was produced in the same manner as in Example 1, except that the final heat treatment was performed for 200 seconds.

Example 10

A polyimide-based film was produced in the same manner as in Example 1, except that the final heat treatment was performed for 400 seconds.

Example 11

A polyimide-based film was produced in the same manner as in Example 1, except that the final heat treatment was performed for 1,000 seconds.

Example 12

A polyimide-based film was produced in the same manner as in Example 1, except that the final heat treatment was performed for 1,500 seconds.

Example 13

A polyimide-based film was produced in the same manner as in Example 1, except that a tension of 30 N/mm$^2$ was applied in the machine direction during the final heat treatment to perform further elongation and heat setting in the machine direction.

Example 14

A polyimide-based film was produced in the same manner as in Example 1, except that a tension of 70 N/mm$^2$ was applied in the machine direction during the final heat treatment to perform further elongation and heat setting in the machine direction.

Example 15

A polyimide-based film was produced in the same manner as in Example 1, except that a tension of 100 N/mm$^2$ was applied in the machine direction during the final heat treatment to perform further elongation and heat setting in the machine direction.

Example 16

A polyimide-based film was produced in the same manner as in Example 1, except that a tension of 150 N/mm$^2$ was applied in the machine direction during the final heat treatment to perform further elongation and heat setting in the machine direction.

Example 17

A polyimide-based film was produced in the same manner as in Example 1, except that the frame, on which the film was fixed, was placed in a vacuum oven, slowly heated from 100° C. to 320° C. for 2 hours (first heat treatment) and then slowly cooled, and then a polyimide-based film was obtained by separation from the frame.

Comparative Example 1

A polyimide-based film was produced in the same manner as in Example 1, except that the fixed frame was shrunk at 85% only in the transverse direction.

Comparative Example 2

A polyimide-based film was produced in the same manner as in Example 1, except that the fixed frame was elongated at 135% in the machine direction and shrunk at 85% in the transverse direction.

Comparative Example 3

A polyimide-based film was produced in the same manner as in Example 1, except that the fixed frame was elongated at 115% in the machine direction and shrunk at 75% in the transverse direction.

Comparative Example 4

A polyimide-based film was produced in the same manner as in Example 1, except that the fixed frame was elongated at 115% only in the machine direction.

Comparative Example 5

A polyimide-based film was produced in the same manner as in Example 1, except that the final heat treatment was performed at 280° C.

Comparative Example 6

A polyimide-based film was produced in the same manner as in Example 1, except that the final heat treatment was performed for 150 seconds.

Comparative Example 7

A polyimide-based film was produced in the same manner as in Example 1, except that a tension of 25 N/mm$^2$ was applied in the machine direction during the final heat treatment to perform further elongation and heat setting in the machine direction.

Comparative Example 8

A polyimide-based film was produced in the same manner as in Example 1, except that a tension of 160 N/mm$^2$ was applied in the machine direction during the final heat treatment to perform further elongation and heat setting in the machine direction.

Comparative Example 9

A polyimide-based film was produced in the same manner as in Example 1, except that neither elongation nor shrinkage was performed in step (S1) and no tension was applied in step (S2).

Measurement Example

Physical properties were measured in the following manner and the results are shown in FIG. 1.
(1) Light transmittance (%): optical transmittance at 550 nm was measured using a spectrophotometer (CM-3700D, Konica Minolta Inc.) in accordance with the standard ASTM E313.
(2) Yellowness: yellowness was measured using a spectrophotometer (CM-3700D, Konica Minolta Inc.) in accordance with the standard ASTM E313.

(3) Pencil hardness: a 50 mm line was drawn 5 times using a pencil (UNI, produced by Mitsubishi) at a speed of 180 mm/min with a load of 1 kg and a pencil hardness causing no scratch on the surface thereof was measured using an electric pencil hardness tester (in the case where a coating layer was formed, in the direction of formation of the coating layer) in accordance with the standard ASTM D3363.

Yield strain (%): yield strain was measured at a cross head speed of 5 mm/min and a grip distance of 100 mm using a universal tester (UTM, Instron) in accordance with the standard (ASTM D882)

On the other hand, in Comparative Example 2, a film could not be obtained due to breakage resulting from excessive elongation in the machine direction in the production of the polyimide-based film, and in Comparative Example 3 wherein excessive shrinkage occurred in the transverse direction in the production of the polyimide-based film, the film sagged, was broken due to friction with the floor and thus could not be obtained. In addition, in Comparative Example 8 wherein excessive tension was applied during the final heat treatment, a film could not be obtained due to breakage. In other words, Comparative Examples 1 to 8 exhibited no great change in physical properties and caused

TABLE 1

| Item (50 μm) | MD elongation (%) | TD shrinkage (%) | First heat treatment maximum temperature | Second heat treatment temperature | Second heat treatment time | Second heat treatment MD tension | Transmittance (%) | Yellowness | Pencil hardness | Yield strain (%) MD | TD |
|---|---|---|---|---|---|---|---|---|---|---|---|
| Ex. 1 | 115 | 85 | 300° C. | 310° C. | 300 s | 80 N/mm$^2$ | 88 | 4.0 | 2H | 6 | 2 |
| Ex. 2 | 105 | 85 | 300° C. | 310° C. | 300 s | 80 N/mm$^2$ | 88 | 4.0 | 2H | 5 | 2 |
| Ex. 3 | 130 | 85 | 300° C. | 310° C. | 300 s | 80 N/mm$^2$ | 88 | 4.0 | 3H | 8 | 1 |
| Ex. 4 | 115 | 85 | 300° C. | 310° C. | 300 s | 80 N/mm$^2$ | 88 | 4.0 | 2H | 5 | 2 |
| Ex. 5 | 115 | 80 | 300° C. | 310° C. | 300 s | 80 N/mm$^2$ | 88 | 4.0 | 2H | 6.2 | 2.0 |
| Ex. 6 | 115 | 85 | 300° C. | 330° C. | 300 s | 80 N/mm$^2$ | 88 | 7.5 | 2H | 6 | 2 |
| Ex. 7 | 115 | 85 | 300° C. | 320° C. | 300 s | 80 N/mm$^2$ | 88 | 5.0 | 2H | 8 | 2 |
| Ex. 8 | 115 | 85 | 300° C. | 290° C. | 300 s | 80 N/mm$^2$ | 88 | 4.0 | 2H | 6 | 2 |
| Ex. 9 | 115 | 85 | 300° C. | 310° C. | 300 s | 80 N/mm$^2$ | 88 | 4.0 | 2H | 5.8 | 2.0 |
| Ex. 10 | 115 | 85 | 300° C. | 310° C. | 1000 s | 80 N/mm$^2$ | 88 | 4.0 | 2H | 6.2 | 2.0 |
| Ex. 11 | 115 | 85 | 300° C. | 310° C. | 1500 s | 80 N/mm$^2$ | 87 | 4.5 | 2H | 8 | 2 |
| Ex. 12 | 115 | 85 | 300° C. | 310° C. | 300 s | 80 N/mm$^2$ | 85 | 6.0 | 2H | 6 | 2.0 |
| Ex. 13 | 115 | 85 | 300° C. | 310° C. | 300 s | 30 N/mm$^2$ | 88 | 4.0 | 2H | 5 | 2 |
| Ex. 14 | 115 | 85 | 300° C. | 310° C. | 300 s | 70 N/mm$^2$ | 88 | 4.0 | 2H | 6 | 2.0 |
| Ex. 15 | 115 | 85 | 300° C. | 310° C. | 300 s | 100 N/mm$^2$ | 88 | 4.0 | 2H | 7 | 2.0 |
| Ex. 16 | 115 | 85 | 300° C. | 310° C. | 300 s | 150 N/mm$^2$ | 88 | 4.0 | 2H | 10 | 1 |
| Ex. 17 | 115 | 85 | 300° C. | 320° C. | 300 s | 80 N/mm$^2$ | 83 | 6.2 | 2H | 7 | 2 |
| Comp. Ex. 1 | No elongation | 85 | 300° C. | 310° C. | 300 s | 80 N/mm$^2$ | 88 | 4.0 | 2H | 2 | 1 |
| Comp. Ex. 2 | 135 | 85 | 300° C. | 310° C. | 300 s | 80 N/mm$^2$ | Production impossible due to breakage | | | | | |
| Comp. Ex. 3 | 115 | 75 | 300° C. | 310° C. | 300 s | 80 N/mm$^2$ | Production impossible due to breakage | | | | | |
| Comp. Ex. 4 | 115 | No shrinkage | 300° C. | 310° C. | 300 s | 80 N/mm$^2$ | 88 | 4.0 | 2H | 2 | 2 |
| Comp. Ex. 5 | 115 | 85 | 300° C. | 280° C. | 300 s | 80 N/mm$^2$ | 88 | 4.0 | 2H | 2 | 2 |
| Comp. Ex. 6 | 115 | 85 | 300° C. | 310° C. | 150 s | 80 N/mm$^2$ | 88 | 4.0 | 2H | 2 | 1 |
| Comp. Ex. 7 | 115 | 85 | 300° C. | 310° C. | 300 s | 25 N/mm$^2$ | 88 | 4.0 | 2H | 2 | 1 |
| Comp. Ex. 8 | 115 | 85 | 300° C. | 310° C. | 300 s | 160 N/mm$^2$ | Production impossible due to breakage during final heat treatment | | | | | |
| Comp. Ex. 9 | No elongation | No shrinkage | 300° C. | 310° C. | 300 s | No further elongation | 88 | 4.0 | 1H | 2 | 2 |

As can be seen from the results shown in Table 1, Examples 1 to 5, wherein the polyimide-based films were produced through elongation in the machine direction and shrinkage in the transverse direction, exhibited great improvement in yield strain in the machine direction compared to Comparative Examples 1 and 4 wherein such elongation/shrinkage was not performed. In addition, Examples 6 to 12 wherein the second heat treatment was performed for 200 seconds or longer at a temperature within −10° C. (290° C.) to +30° C. (330° C.) of the first heat treatment temperature (300° C.), exhibited great improvement in yield strain in the machine direction, compared to Comparative Examples 5 and 6 wherein such second heat treatment was not performed. In addition, Examples 13 to 16 wherein a tension of 30 to 150 N/mm$^2$ was applied under the same conditions during the second heat treatment secured sufficient yield strains compared to Comparative Examples 7 and 8 wherein the tension was excessively low or high.

breakage of the film, unlike Comparative Example 9 wherein no treatment was performed.

These results indicate that the polyimide-based film of the present disclosure has excellent bending characteristics such as yield strain and is thus advantageous for use as a substrate for various applications of flexible display electronic devices, more particularly, foldable and rollable display electronic devices having a radius of curvature of 1 mm (1R) or less.

The invention claimed is:
1. A method of manufacturing a polyimide-based film in a roll-to-roll manner comprising:
conducting first heat treatment (S1) on a polyimide-based film obtained as a gel state formed by being cast on a support while elongating the polyimide-based film at an elongation percentage of more than 100% and less than 135% in a machine direction (MID) and shrinking the polyimide-based film at a shrinkage percentage of more than 75% and less than 100% in a transverse direction (TD); and conducting second heat treatment (S2) on the first heat-treated polyimide-based film while further elongating the polyimide-based film in the machine direction (MD) at a tension not less than 30 N/mm² and less than 160 N/mm², wherein a maximum heating temperature during the first heat treatment is 250° C. to 330° C., and the second heat treatment is performed for 200 seconds or longer at a temperature within −10° C. to +30° C. of the maximum heating temperature reached during the first heat treatment.

2. The method according to claim 1, wherein, in step (S1), the elongation percentage in the machine direction is 105% to 130%.

3. The method according to claim 1, wherein, in step (S1), the elongation percentage in the machine direction is 115% to 130%.

4. The method according to claim 1, wherein, in step (S1), the shrinkage percentage in the traverse direction is 80% to 100%.

5. The method according to claim 4, wherein, in step (S1), the shrinkage percentage in the transverse direction is 80% to 95%.

6. The method according to claim 1, wherein, in step (S2), the time for second heat treatment is not less than 200 seconds and less than 1,500 seconds.

7. The method according to claim 1, wherein, in step (S2), the tension is 30 N/mm² to 150 N/mm².

* * * * *